Oct. 6, 1936.                     A. MOORE                    2,056,615
              SUPPLYING, PREPARING, AND DISTRIBUTING OF
               CHARGES FOR INTERNAL COMBUSTION ENGINES
                      Filed March 28, 1931          5 Sheets-Sheet 2
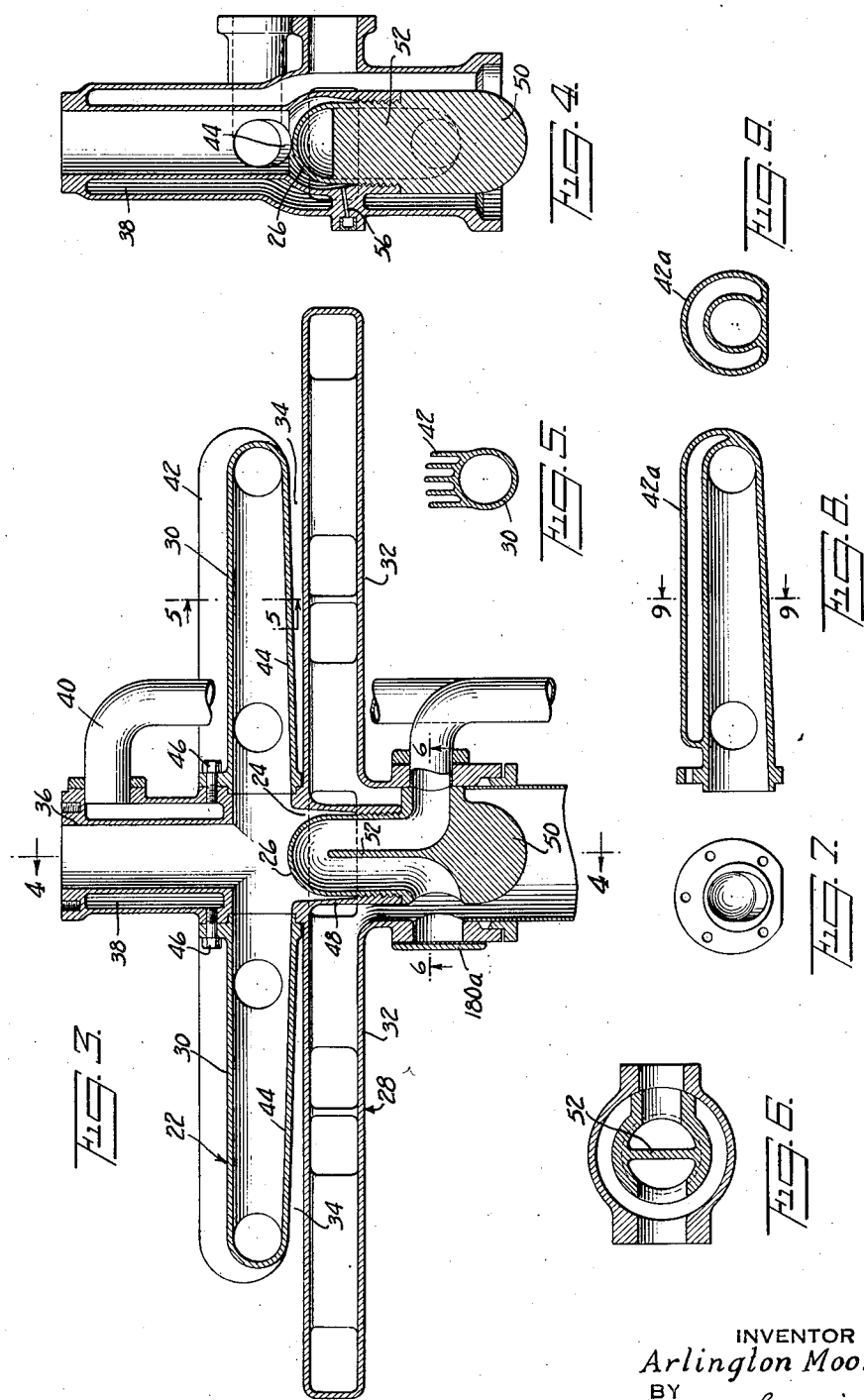
INVENTOR
*Arlington Moore*
BY
*Dyke and Schaines*
ATTORNEYS

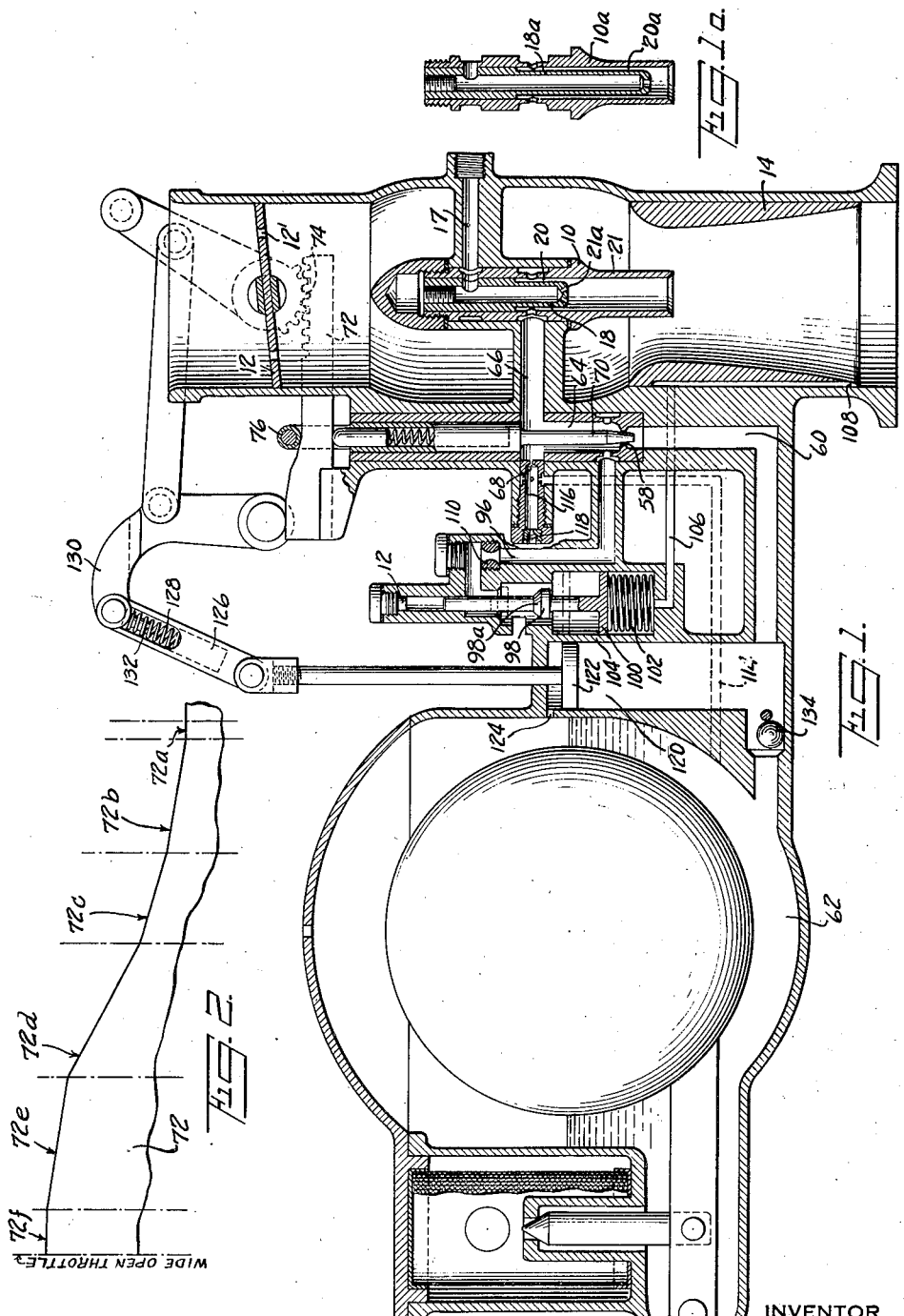

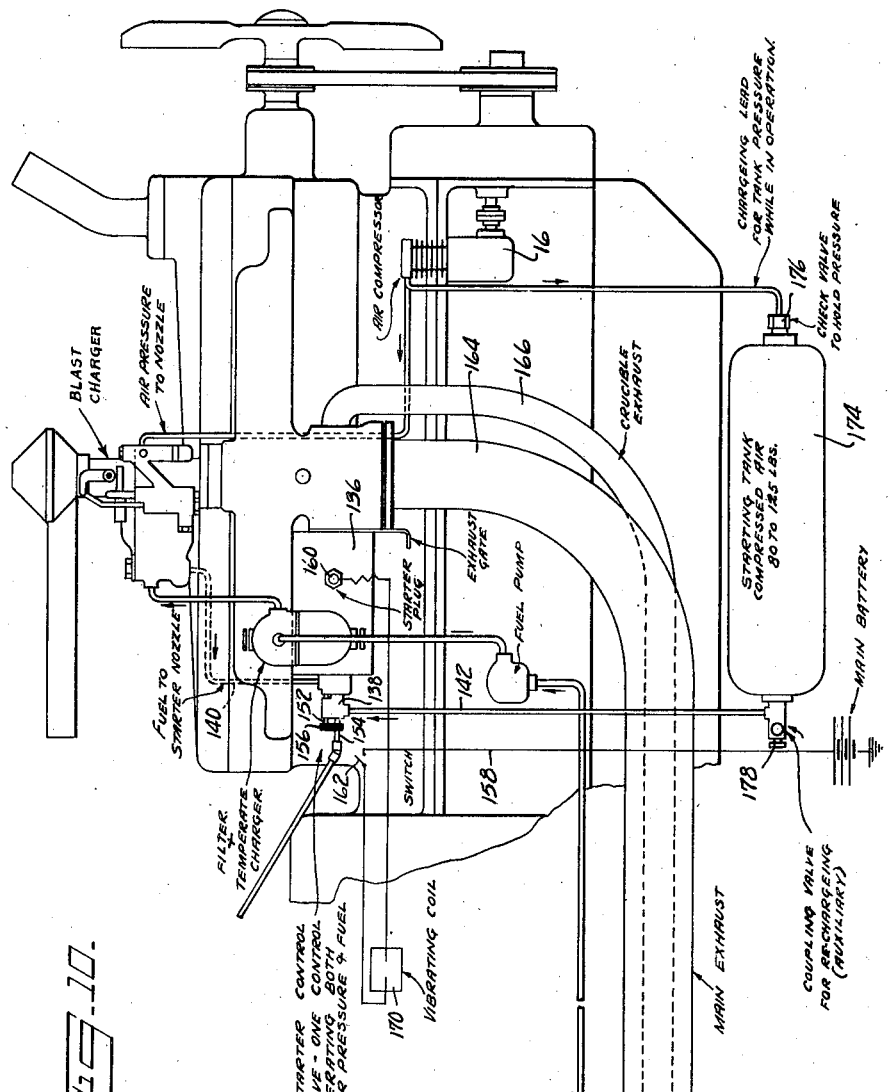

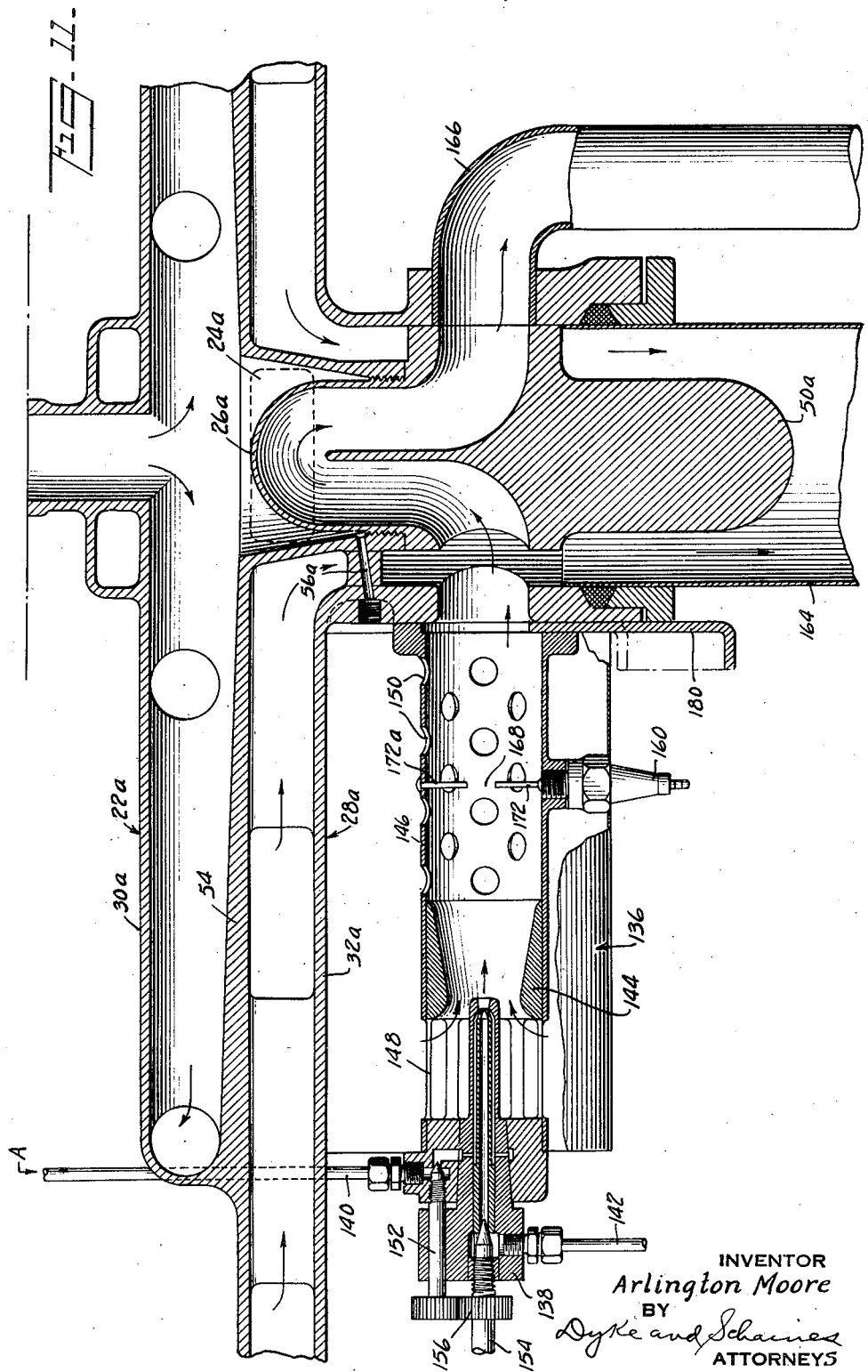

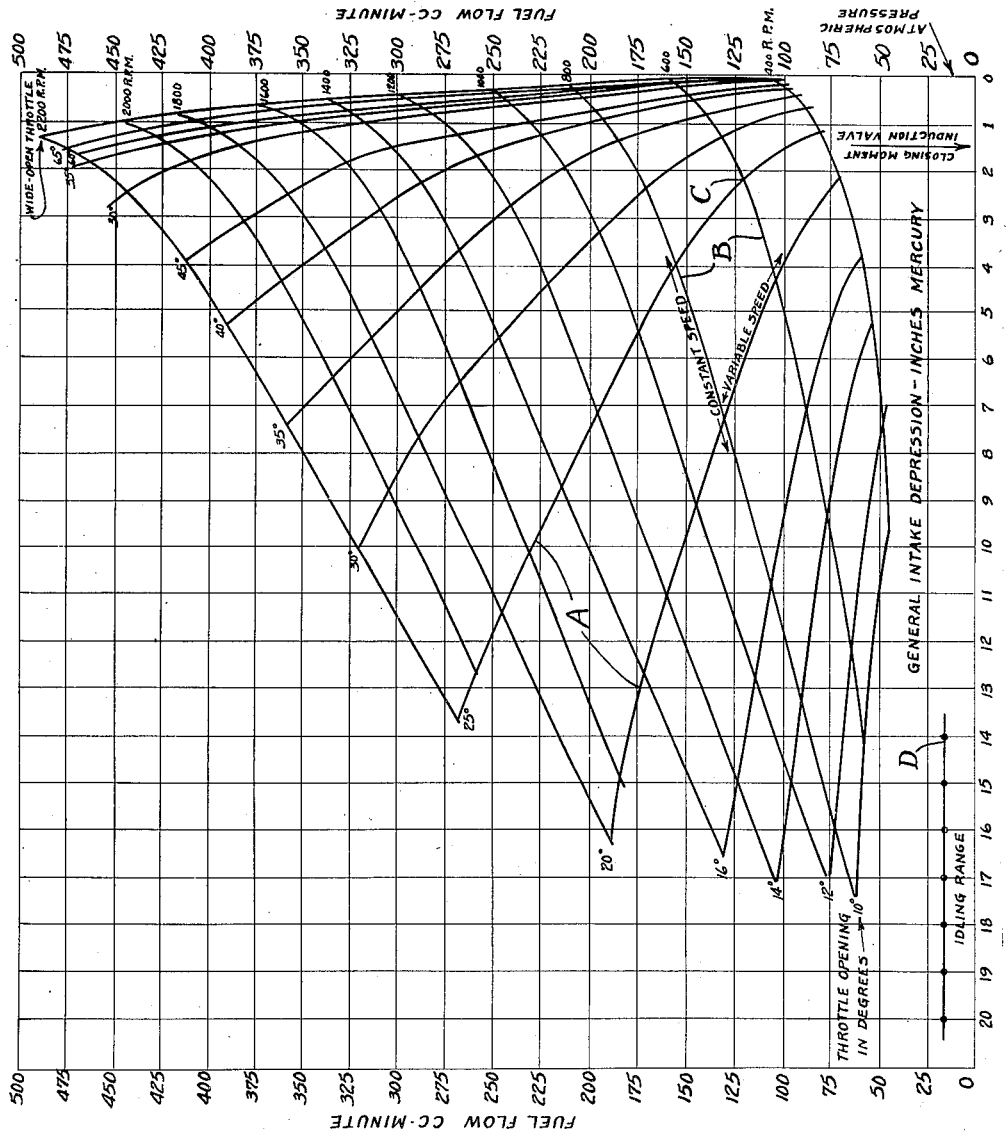

Patented Oct. 6, 1936

2,056,615

UNITED STATES PATENT OFFICE 2,056,615

SUPPLYING, PREPARING, AND DISTRIBUTING OF CHARGES FOR INTERNAL COMBUSTION ENGINES

Arlington Moore, New York, N. Y., assignor, by mesne assignments, to Maxmoor Corporation, New York, N. Y., a corporation of Delaware Application March 28, 1931, Serial No. 525,992

63 Claims. (Cl. 123—132)

My invention relates to the supplying, preparing, and distributing of charges for internal combustion engines.

This application is in extension of and covers advances over my prior copending applications, such as Serial No. 472,310, filed August 1, 1930, now Patent No. 2,028,989, containing subject matter cognate to that claimed herein. As in said applications, I introduce the fuel on that side of the air metering throttle nearest to the engine cylinders. Discharge of the fuel into this region of reduced pressure keeps the fuel from striking against the throttle and materially assists in fuel vaporization. The ample pressure reduction thus made available at the fuel jet eliminates need for depending, during fractional load operation, on constricted venturi air-flow to produce fuel flow, and permits the air conduit to be of ample section, adapted to supply maximum air when the throttle is opened, and allowing the engine to develop its full power without interference by air constriction.

The pressure reduction about the fuel jet, so located however, increases as the throttle is adjusted towards closed position, while the fuel requirements decrease.

A principal object of the invention is to control the fuel supply to accord with the air supply, notwithstanding that the intake depression inductive effect on the fuel tends, when the air is manually varied, to vary in inverse relation to fuel requirements.

Another object of the invention is to effect the fuel delivery in accord with the air supply under the intake depression conditions existing on the cylinder side of the air metering throttle, by maintaining the depression on the fuel below that in the intake, thereby enabling the use of fuel passage areas larger than would be required to pass the proper fuel in response to the full intake depression, and avoiding excessively small fuel passage areas productive of high coefficients of friction.

A further object of the invention is to control the fuel flow by variation of the fuel passage area with changes in air passage area together with making compensation for intake depression changes due to speed change.

A further object of the invention is to control the fuel flow to supply the required fuel for a given condition at each throttle position partly by regulation of fuel passage area and partly by regulation of pressure differential effective to produce fuel flow as the speed varies.

A further object of the invention is to control the fuel passage area with changes in air passage area so as to secure a desired relation therebetween for a given engine speed, and to control the passage of fuel therethrough as the speed is changed at each throttle position through variation of the pressure differential effective to produce fuel flow.

A further object of the invention is to enable the utilization, during full load operation, of the normal intake depression or other pressure reduction acting on the fuel jet for producing fuel flow, and, during fractional load operation, of pressure reduction less than that prevailing in the intake at such stage for producing fuel flow.

Another object of the invention is to effect a fuel flow at idling which is smooth and steady even though the intake depression may fluctuate considerably.

Further objects will appear in connection with the following description.

In my drawings:

Figure 1 is a diagrammatical sectional view of apparatus for supplying the charge components and adapted for supplying fuels, such as gasoline, without the use of a compressor for blasting;

Fig. 1a is a sectional view of a nozzle, utilizing blasting gases under superatmospheric pressure, to be substituted for the fuel nozzle of Fig. 1 when using heavier or non-volatile fuels, such as fuel oil;

Fig. 2 is an enlarged detail side view of a key or cam for controlling the fuel passage area;

Fig. 3 is a longitudinal section, on a reduced scale relative to Fig. 1, of a manifold system adapted for use with the apparatus shown at Fig. 1;

Fig. 4 is a transverse section thereof on the line 4—4 of Fig. 3;

Fig. 5 is a transverse section thereof on the line 5—5 of Fig. 3;

Fig. 6 is a horizontal section thereof on the line 6—6 of Fig. 3;

Fig. 7 is a detail view of the inner end of one of the intake manifold branches;

Fig. 8 is a longitudinal section showing a modified form of intake manifold branch employing water cooling;

Fig. 9 is a transverse section thereof on the line 9—9 of Fig. 8;

Fig. 10 is a side elevational view, with parts broken away, of a transportation engine installation embodying my improvements and arranged for use of fuel oil;

Fig. 11 is a longitudinal section, on an enlarged scale relative to Fig. 10 and on a reduced scale relative to Fig. 1, of the manifold system shown at Fig. 10 for heavy or non-volatile fuels and adapted to cooperate with the apparatus shown at Fig. 1, particularly when utilizing the nozzle shown at Fig. 1a;

Fig. 12 is a curve showing the character of fuel flow obtained through my invention at various speeds and loads throughout the range of intake depression.

*Influence of air flow on fuel flow*

I utilize the air flow for producing pressure depression, augmenting intake depression when the same is weak, to vary the fuel flow directly with the air flow to such extent as can be done without constricting the air flow, by locating the fuel nozzle 10 or 10a (Fig. 1a) on the side of the air metering throttle 12 toward the engine cylinders and preferably at the throat of a large sectioned venturi 14. The air flow through venturi 14 serves to produce pressure depression of useful magnitude for promoting fuel delivery. When the air quantity or speed is minimum, air flow through the large venturi is not largely relied on for producing fuel flow, other more powerful forces being available, as will be pointed out.

*Fuel blasting and vaporizing*

I blast or comminute the fuel, preferably downward with downdraft air flow, so as to work with gravity, by gaseous fluid, preferably clean air, either supplied at atmospheric pressure and induced by the pressure reduction in the intake, this arrangement being satisfactory for lighter fuels, such as gasoline, or supplied, for fuel oils or heavy fuels, at a superatmospheric pressure varying directly with the engine speed, preferably from a compressor 16 (Fig. 10) driven off the engine shaft. When the atomizing air under atmospheric pressure is used it is admitted through a passage 17, which passage can also be employed for admitting the air from the compressor. Passage 17 communicates with central tubular nozzle 18 disposed within the fuel nozzle 10 and spaced therefrom to form an annular passage 20 for supplying the fuel therearound. The fuel nozzle 10 is provided with a relatively elongated discharge end 21 projecting beyond the end of the nozzle 18 a substantial distance relative to the diameter of the end 21 to provide a chamber wherein the air, being discharged through the outwardly directed discharge openings 21a, is admixed with the fuel, a high degree of atomization being obtained because of the elongated discharge end 21, particularly when gasoline and lighter fuel oils are used, without appreciable diminution of fuel lifting effect, the injector action of the air apparently counterbalancing any reduction of pressure due to admission of air at this point.

When the compressor 16 is employed, the nozzle system 10 (Fig. 1) is replaced by the nozzle system 10a (Fig. 1a) and the compressor put in communication with the passage 17. By injectively relating the air blast from the engine-operated compressor 16 to the fuel nozzle 10a, as for example, discharging the air through the central tubular nozzle 18a, and supplying the fuel therearound through the annular passage 20a, between air nozzle 18a and the bore walls of fuel nozzle 10a, as shown in Fig. 1a, I vary the pressure reduction upon the fuel, that is caused by the air blast, directly with pressure change of the blasting air, thus providing a force component tending to vary the fuel supply directly with changes in engine speed.

I discharge the fuel from nozzle 10 or 10a, finely comminuted by the air blast, through and beyond the branching air stream in the intake manifold 22 (Figs. 3 to 9) or intake manifold 22a (Fig. 11) into an annular fuel vaporizing recess or crucible 24 or 24a and into contact with the walls of said crucible 24 or 24a and the dome 26 or 26a therein, both healed by exhaust gases converging within the exhaust manifold 28 or 28a to a temperature adapted for spheroidizing vaporization of the fuel. I thus obtain charge material that is persistently homogeneous, and not liable to condense, and avoid coating the intake manifold wall with tarry or other deposits resulting from fuel decomposition.

In the form of combined intake and exhaust manifold system shown at Figs. 3 to 9 for homogenizing, and distributing the charge material the intake conduit branches 30 are disposed above but in separated relation to the exhaust manifold branches 32, as indicated at 34, to reduce the heating effect on the charge mixture passing through the branches, the exhaust gas heating effect being concentrated at the central portion of the system at the crucible 24 and dome 26 with exhaust gas heating applied to the descender or entrance portion 36 through jacket 38 communicating with the exhaust conduit 28 and being vented through pipe 40 directly to atmosphere in order to insure positive circulation of exhaust gas through jacket 38. The fuel of the charge mixture after passing through venturi 14 is thus prevented from depositing upon the descender 36 to cause wall washing, and better preliminary vaporization of the fuel component of the mixture is obtained before the charge is deflected into the branches 30. Fuel particles blasted or otherwise projected into the crucible 24 are revaporized and returned into the air or charge stream. In this form of manifold, particularly adapted for fuels requiring the application of less heat to keep the same in suspension, substantially the entire application of heat to the fuel for vaporizing the same is done before the mixture passes into the intake branches so that heating of the charge within the branches is prevented or reduced or rendered unnecessary, thereby obviating undue expansion of the charge liable to cause reduction in volumetric efficiency. Means 42 for further facilitating cooling of the intake branches 30 may be provided. At Figs. 3 and 5 such means comprise heat radiating vanes 42 projecting from the upper portions of the branches 30 while at Figs. 8 and 9 such means comprise water jackets 42a disposed about the top and sides of the manifold branches. In both forms the bottom or floor 44 of each branch 30 is preferably exposed to the radiated heat from the contiguous exhaust branch 32 to prevent fuel condensation, such floors 44 sloping downwardly towards the crucible 24 for also draining fuel thereinto under certain conditions of operation, as upon starting or accelerating.

In order to facilitate fabrication, reduce the cost and render the manifold system more universal or standard in its application to engines of various makes and sizes, the exhaust manifold 28 is preferably formed integrally with the central portion 36 only of the intake manifold, the branches 30 being separately formed, preferably of aluminum, and secured in position to form lateral passage continuations of the descender or central portion 36 by means of screws 46.

This integral structure includes an annular portion 48 extending downwardly into the exhaust conduit to form the outer wall of the crucible 24. The lower end of the portion 48 is closed by the separate dome member 26, preferably formed of copper, and having a relatively massive integral lower portion 50 formed at 52 to insure positive circulation of exhaust gas through the dome, and serving as a heat reservoir, as described in my copending applications Ser. No. 513,804, filed Feb. 6, 1931 and Ser. No. 514,105, filed Feb. 7, 1931.

The form of manifold system shown at Fig. 11 is preferred when heavy fuels or oils are employed requiring more heat to maintain the same in suspension. As there shown at 54 I make the branches 32a of exhaust conduit or manifold 28a integral with the bases of the branches 30a of the intake conduit 22a to heat the branch floors, and form such floors to drain into said crucible 24a and thereby assist the vaporization and return of any deposited fuel into the air stream.

I vent crucibles 24 and 24a to the atmosphere at 56 and 56a to provide drain outlets therefrom and/or to bleed air thereinto and so prevent fuel from accumulating therein and assist in vaporizing fuel in the crucibles. Provision can also be made for controlling charge velocities in the intake branches by causing the same to taper in cross-section towards the outer ends thereof, as described in said applications Ser. Nos. 513,804 and 514,105.

Fuel gate operated with air gate

I locate the fuel supply orifice or fuel gate 58 below the fuel level in a passage 60 providing communication between the float chamber 62 and nozzle 10 or 10a, and including a vertical portion 64 extending to a point above the fuel level and a lateral extension 66 connecting with the fuel nozzle 10 or 10a. In this way I obtain flow of fuel in ready response to differential pressure acting thereon, but I avoid siphoning out the fuel when the engine is not running by venting the upper portion of the fuel passage 60 through the idling fuel jet 68 as described below.

I control the fuel passage area by valve 70, forming an annulus with and adjustable in orifice 58, by means of the readily replaceable horizontally sliding cam or key 72 actuated from the shaft of throttle 12 by a rack and sector connection 74. Cam 72 operates fuel valve 70 by engagement with the roller 76 on the fuel valve. I so arrange the contour of cam 72 as to take care of changes in intake depression due to air throttling being substantially inversely related to need for fuel. I overcome this inversion and obtain fuel flow to accord with air flow by causing the cam-controlled valve 70 to give a fuel gate opening at 58 for each air-throttle opening of a size to pass the needed fuel in response to the depression effective on the fuel gate, which, as will be seen later, I at certain times keep less than and at other times greater than the intake depression in the intake at the fuel nozzle. I preferably obtain the predetermined openings of fuel gate 58 by providing cam 72 for operating fuel valve 70 with differently slanting parts as 72a, 72b, 72c, 72d, 72e, 72f which will be referred to in further detail hereafter. I take care of the fuel needs changing with changes in engine speeds for each fuel valve position by suitable variations of the pressure differential acting on the fuel, as hereafter described under another heading.

While the fuel valve 70 can be arranged to supply fuel for idling, I prefer to handle the idling fuel separately in manner described below, and bring the main fuel valve 70 to a substantially closed position during engine idling (by roller 76 coacting with cam part 72a) thereby avoiding adjustment of the fuel valve 70 for regulation of idling fuel, the orifice 58 then being slightly vented to keep the same wet and prevent sticking of the valve therein.

Calibration

The internal combustion engine, such as employed for example in motor vehicles is controlled by means of the throttle to compensate for load or to vary the speed. At each throttle position the speed varies inversely with the load, the maximum speed becoming greater as the throttle opening increases. The fuel required for operation at minimum speeds varies, in general, directly with the throttle opening. It also varies directly with the speed at each throttle position. For economical operation the mixture ratio is varied as the conditions of operation vary, the mixture being made richer for power conditions of operation and leaner for other conditions of operation. In my invention I control or adjust, as hereinafter described, the pressure differential range effective for causing fuel flow at the various throttle positions, and then produce for each throttle position through cam 72 the particular fuel passage area individually determined for allowing, under the adjusted pressure differential as the speed varies, a fuel flow in suitable ratio to the air supplied.

To determine the contours of a key or cam 72, so as to properly control the opening of fuel valve 70 for any particular type of engine, I operate an engine of such type at various throttle openings under such conditions of load that substantially a low speed of say 300 R. P. M. is obtained at each position of the throttle. I adjust valve 70 for each of the several throttle openings until desirably good operation and the desirable fuel-to-air ratio is obtained under such conditions, and form the cam part or key 72 so that, when it is put in place in the apparatus, the test-determined openings of valve 70 are duplicated for the several throttle positions. In this way a predetermined correct opening of fuel valve 70 is obtained to go with each air throttle position.

The typical cam contour formation so obtained, while continuous with its parts merging into one another, can best be described by reference thereto as divided into several parts corresponding to the differing conditions for various throttle positions. The part 72a engaging roller 76 of valve 70 during engine idling when the air throttle 12 is substantially closed or opened very slightly say up to about 2½° of angular movement may be referred to as substantially neutral, being adapted to hold valve 70 at or very slightly off its seat so that, while practically no fuel is passed at the annular fuel passage 58, the latter is kept wetted by the fuel and fuel will flow quickly when valve 70 is further opened. The fuel supply for idling is obtained through a special idling jet 68 hereinafter described and sufficient air for slow engine idling is admitted through the several air bleed apertures, the blasting nozzle 18 or 18a, and the small balanced idling air holes 12' in the air throttle 12. The idling speed can be varied by opening the throttle up to about 2½° from closed position without enlarging the orifice at 58.

The slightly rising cam part 72b, functioning for example, between 2½° and 19° of throttle movement, is the part coacting with and determining the opening of valve 70 during the very low fractional load operation at which time fuel through orifice 68 is being supplied. This in motor vehicle engines represents the takeout period of merging from idling into power operation.

The part 72c, functioning, for example, between 19° and 32° of throttle movement increases the fuel valve opening at more rapid rate at the time the idling orifice 68 ceases supplying any material part of the fuel and the intake depression starts decreasing with throttle opening.

The relatively steep cam part 72d, functioning for example between 32° and 52° of throttle movement, serves to lift the fuel valve 70 to correspond with progressive throttle openings productive of materially increased air flow.

After the throttle opens about 50° or 52°, provided the intake cross section is ample, there is substantially no increase in air flow at low speeds upon further opening of the throttle, wherefore it results that increase of fuel flow is not desirable, except to such small extent as may be wanted to give a fairly rich power mixture throughout operation with the throttle wide open. At high speeds between about 52° and 72° of throttle movement however there is more intake depression than at wide open throttle, and I therefore provide the slight taper 72e so that there is an economical transition into full load. I then make provision for permitting the air throttle 12 to open through about the last 8 degrees of its angular opening movement, with little or no corresponding opening up of fuel valve 70, by making the last cam contour part 72f practically straight.

When the throttle is partly closed, and the cam part 72c or the lower end of part 72d controls the opening of fuel valve 70, the intake depression is such that the air bleed passage hereafter described is open. However, the consequent lessening of pressure differences across fuel valve orifice 58 does not derange the desirable fuel-to-air ratio, because the calibration determination of the corresponding part of cam 72 is made under the same conditions, as well as under the other conditions of normal engine operation, such as with the injecting air or blast in operation, and the idling fuel jet 68 is also open during calibration and during normal engine operation. By making the calibration of the fuel passage areas for low speeds, proper fuel for such speeds is insured, and each fuel passage opening is suitable with the changed pressure difference on the fuel to supply proper fuel for higher speeds.

*Air introduction to fuel conduit*

To suitably vary the fuel flow upon speed changes at each throttle position and the corresponding fuel valve position, and to lessen the high depression at the exit side of the fuel valve port 58, I provide a passage 96 for limited communication from a source of air at higher, preferably atmospheric, pressure to the fuel conduit 60 at a point immediately beyond the annular orifice 58 but still below the fuel level. I control the air inlet 96, as by moving valve 98 in said passage 96 by means of the pneumatic piston 100 acting against spring 102, and working in a cylinder 104 connected by the conduit 106 with the region of reduced pressure in the intake and preferably communicating therewith at 108 exteriorly of the venturi 14, and hence made subject to only the static pressure reduction in the intake which is less than the pressure reduction within the venturi about the fuel nozzle that is acting to produce fuel flow. By using the static depression, rather than the Venturi depression to operate valve 98, a lighter spring 102 can be used and valve 98 made more responsive to changes in intake depression.

Such valve 98 can be kept closed, but preferably is slightly cracked during operation at depressions lower than a predetermined minimum, such as the depressions occurring at wide open throttle position, and is open to increase the attenuation of pressure reduction on the orifice 58 when the depression exceeds said minimum, such as over practically the entire fractional load range, the static or general intake depression being higher than the minimum needed to overcome the tension of spring 102. By air introduction through passage 96 the action of depression and other fuel flow inducing forces is divided to be effective on both the air coming in at 96 and on the fuel coming in at 58, or otherwise stated, the pressure differential acting on the fuel is reduced. The maximum opening of passage 96 is made adjustable to regulate the maximum air that is bled therethrough by inserting air jets 110 of different sizes, as, for example an air jet .070" diameter with a predetermined key contour has been used. When the depression is reduced below that stated above, the valve 98 is moved towards closed position by spring 102, until the opening past the valve becomes less than the jet opening 110, but at least opening is preferably held slightly off its seat by adjustable stop 112 to give a smoother transitional action, and better vaporization at full load operation.

The critical intake depression at which the opening of the valve 98 reduces to minimum under the action of spring 102 is preferably in excess of the static intake depression in the intake during engine operation at maximum speed (in some engines, from about 1.75" Hg to 2" Hg depression) when the throttle 12 is substantially wide open, and the fuel orifice area at 58 is maximum and incapable of further enlargement. This reduction in the admission of primary air prevents undue leaning out of the mixture under conditions of engine operation at or approaching full load, insuring the formation of the power mixture ratios required under such load conditions of operation. The introduction of some primary air (in minimum quantity) at full load serves to neutralize, by relatively slight attenuation of pressure differential at orifice 58, the tendency of the venturi 14 to cause excessive mixture enrichment at maximum speeds, and this is effected without undue leaning out of fuel when the inductive forces promoting fuel flow decrease in intensity at other speeds at full load.

The critical value of intake depression at which valve 98 moves to minimum opening to reduce the primary air introduction to minimum should be such as to render the available inductive forces for promoting fuel flow most effective in producing power mixture ratios at low speeds, and/or under load conditions of operation as the throttle approaches its wide open position. As the intake depression exceeds this critical value, the primary air valve 98 opens to attenuate the inductive forces causing fuel flow, and thereby to maintain economy mixture ratios at fractional load operation.

The particular value of static intake depression at which the valve 98 should be adjusted to close or open will vary, depending upon the various factors controlling fuel flow, such as the orifice area variation, the distance of fuel lift, the character of the venturi or venturis, and whether or not fuel flow is augmented by the inductive action of atomizing gases under pressure, such as by compressed air injection as disclosed herein.

The vertical primary air passage 96 is submerged below the fuel level in the float chamber 62 so that, when the pressure in the intake approaches atmospheric, fuel will rise in said passage 96 up to the level of the fuel in the float chamber. Therefore, during engine operation, the reduction in pressure in the intake or venturi must attain a value sufficient to draw the fuel out of or dump the passage 96 before the primary air can be admitted for reducing or attenuating the pressure differential on the metering orifice 58. Should the depression during engine operation at very low speeds characterizing engine lugging conditions, such as at minimum speed wide open throttle, at which speed rich mixtures are required although the fuel flow inducing forces are minimum, fall below that required to dump the passage 96, the latter hydrostatically fills with fuel to automatically close off the introduction of primary air, and thus to render the entire available pressure reduction in the intake or venturi effective in producing fuel flow. The critical value of depression at which the passage 96 dumps the fuel or fills with fuel depends on the extent of submergence of said passage and of the metering orifice 58, the extent of submergence being designed in each case to satisfy the requirements for operation.

This hydrostatic action becomes effective to completely close the passage 96 when the pressure differential effective in lifting fuel becomes appreciably less than the depression at which the valve 98 moves to position for minimum primary air introduction, the valve control and the hydrostatic control being in series; the first operating at a higher depression, and the latter at a lower depression, to prevent minimum primary air introduction at minimum speed full load.

The hydrostatic action above-described is particularly relied on to insure adequate fuel flow at minimum speed full load when the fuel flow inducing forces are not augmented by the inductive action of high pressure gases, such as compressed air. When high pressure gases are employed for augmenting fuel flow, the minimum pressure differential on the fuel is higher, and more fuel can be lifted at minimum speeds, but, even with the use of supplementing fuel flow inducing forces, the hydrostatic principle can be employed by suitable adjustment of the extent of submergence of the passage 96.

The hydrostatic control of the primary air as above described provides effective means for tailing up the mixture ratio under engine lugging conditions at minimum speed full load, when the fuel flow inducing forces are minimum, thereby reducing the liability of the engine to stall under heavy loads.

The reduction of pressure differences across the fuel gate 58, by the admission of air through the passage 96, enables the use at periods of high intake depression of an annular fuel passage opening at 58 larger than the small opening that would have to be used to hold the fuel back against the full intake depression, with resulting elimination of the irregularity of flow that would be incidental to use of such smaller opening and greater depression.

Air passage 96 is preferably varied in size as the valve 98 approaches its position of minimum opening by forming valve 98 with a taper 98a. The opening in which the taper 98a moves is thus progressively restricted relative to opening 110 so that there is a smooth transition in the effectiveness of the air in varying the fuel flow as the bleeding effect varies from maximum to minimum, and vice versa.

The variations in intake depression effective on such fixed air hole 110 give a sufficient corresponding variation in air flow therethrough and in fuel flow through valve port 58, in response to the remaining depression effective to produce fuel flow, to keep the fuel-to-air ratios from going up unduly with increase in engine speed for each air gate and fuel gate position.

The air being introduced is thus varied because of the variations in intake depression acting on a fixed orifice at the higher intake depressions and by progressive restriction of the passage 96 by the taper 98a as the intake depression becomes less.

The closing off or reduction to minimum opening of air control valve 98 as described, leaves the fuel, that is supplied at 58 to the fuel passage 64, subject to the depression effects on the nozzle 10 or 10a of air flow, fuel blasting, if employed, and general intake depression. At wide open air-throttle operation, for example, when the fuel gate position is fixed by fuel valve 70 (roller 76 being lifted by cam part 72f) at the maximum opening, each of these inductive effects on the fuel varies directly with the speed and so directly with need for fuel, and the resultant pressure difference enables the securing through the unchanging fuel passage opening, of the variation of several hundred percent in fuel flow that is required through the speed range in full load operation.

The admission of air at 96 with the metered fuel coming in at 58 produces an air-fuel mixture in the conduit which, on passing to nozzle 10 or 10a, is more effectively broken up than solid liquid fuel by blasting and/or delivery into partial vacuum. As the fuel has already been metered at 58 prior to admixture with the primary air, the correct air-to-fuel proportioning can be obtained. Always having an ample pressure difference for securing the fuel flow I do not resort to admixture of the primary air with the fuel in order to enable securing of fuel lift from feeble pressure differences, as is sometimes done in ordinary carburetor practice. While the depression available with my process could be used to lift fuel through some distance, I dispense with such function, and supply the fuel close up to the nozzle at a constant float controlled level, to avoid the irregularities in supply of fuel that can occur when fuel is lifted through substantial distances.

The air passage 96 is wide open at idling because of the high depression acting on piston 100. Fuel valve port 58 is substantially closed, so that the fuel conduit 64 admits air only, and such air serves as a carrier for the idling fuel mixture supplied at 68 and delivered to the fuel nozzle 10 or 10a through the last reach 66 of conduit 60. Furthermore, the depression for supplying idling fuel is materially reduced by the communication to atmosphere being opened up at 96.

Fuel valve port 58 is also closed, and air inlet 96 open at deceleration periods of motor vehicle engines, when the depression is maximum by reason of the throttle being closed while the engine speed is high, thereby avoiding fuel waste during such periods.

When fuel oils, or heavy fuels, are used, the compressor 16 is preferably employed, and the pressure reduction upon the fuel is then dependent upon the injector action of the blasting air and the pressure reduction in the intake, with the result that valve 98 is maintained in full open position and, in the embodiment of the invention illustrated, the hydrostatic control of the primary air is eliminated. The use of compressed air, however, insures that the fuel flow inducing forces will be sufficiently great even at minimum speeds to secure adequate fuel flow.

*Regulation of fuel flow for various engine speeds*

If the engine speed is increased, with the air metering throttle wide open, the air flow rises rapidly, necessitating a correspondingly considerable increase in fuel supply. A typical case is increase from 110 cc. per min. at substantially minimum speed to nearly 500 cc. per min. at substantially maximum engine speed, both at wide open throttle. As has been seen, the fuel passage area is maximum when the throttle is wide open. Venturi 14 is chosen of such throat size that the depression on the fuel nozzle 10 or 10a located at the throat thereof rises in response to air flow increase resulting from engine speed increase at wide open throttle so as to cause the required fuel to pass through the wide open fuel conduit. Also, as already seen, the blasting pressure and injection of fuel thereby increase directly with increase of engine speed. It has already been noted that air passage 96 is kept substantially closed or slightly open during operation at wide open throttle except when the hydrostatic action of the fuel is effective to close the primary air passage 96 at minimum speed full load as above described, the opening increasing from minimum only when the depression in the intake is higher than that characteristic of high speed wide open throttle operation so that during open throttle operation under load the maximum available pressure difference on the nozzle, except as slightly attenuated by minimum primary air introduction, is made use of to cause the fuel to flow. As the venturi is not relied on to induce fuel flow at low fractional loads, as is the case with ordinary carburetor practice, it can serve the function of promoting fuel flow at and toward wide open position of the air throttle, and still be large enough not to cause restriction of air flow reducing the charge density.

If the throttle be closed somewhat from wide open position, as for instance, to 60°, while this makes substantially no difference in air flow and fuel flow at low engine speeds, there is a material reduction in air flow at the higher speeds, with resulting reduction in need for fuel. At such times, however, the intake depression is higher, valve 98 and air passage 96 are opened, the pressure reduction across orifice 58 is lessened, the fuel flow is correspondingly decreased, and the requirements for economical operation are satisfied. Upon passing to the lower part-fractional load operation, the intake depression is further increased by the further closing of the throttle and the fuel passage area correspondingly reduced in consonance with reduction of throttle opening, and this automatic air-bleed fuel compensation becomes increasingly effective.

It will be seen that by my invention at the higher intake depressions, for example, at intake depressions above that existing at wide open throttle high speed, I reduce the effects thereof on fuel flow by maximum primary air introduction, and at the lower intake depressions augment the effects thereof on fuel flow by air flow through a venturi, or by the action of an injecting fluid, or both. The pressure differential on the fuel is thus kept within range to cause, upon fuel passage area adjustment, a flow of fuel in suitable ratio to the air throughout the speed range at each of the throttle positions. At the smaller throttle openings the air passage 96 is open to the maximum for reducing the pressure differential on the fuel continuously throughout the speed range at each of such throttling openings, the pressure differential attenuating effect increasing with speed increase and consequent intake depression increase, more rapidly than the fuel flow increases. At maximum throttle opening the pressure differential attenuation on the orifice 58 is minimum except at minimum speed when the primary air is hydrostatically closed off by the fuel. The transition between maximum and minimum attenuation of pressure differential on the orifice 58 by operation of valve 98 occurs at intermediate throttle positions at certain reduced speeds corresponding to and accompanied by the intake depression of the critical value effective in causing operation of valve 98. Hence, at each of these intermediate throttle positions, as the speed decreases to that reducing the intake depression to its critical value, valve 98 closes, and as the speed increases to increase the intake depression above its critical value, the valve 98 opens. By this arrangement, whenever the speed reduces to such point, that the engine is operating substantially under load conditions requiring power mixture ratios, the valve 98, when the critical intake depression indicative of such load conditions of operation is attained, closes to minimum to render the inductive forces more effective in promoting fuel flow, and thus to satisfy the requirements for fuel, and as the speed increases for operation at light loads, and the intake depression correspondingly increases, the valve 98 opens to produce economy mixture ratios.

In Fig. 12 is illustrated graphically the results obtained by my said invention in controlling fuel flow, where the fuel is delivered into the intake in the region of intake depression beyond the throttle. I have shown therein a series of curves A for successive throttle openings (with which, of course, go corresponding predetermined fuel valve openings) in which curves observed general or static intake depression is plotted horizontally in increasing values from left to right, and the observed fuel flow in cubic centimeters per minute (cc/m) is plotted vertically.

These curves show fuel flow that actually takes place through the particular fuel valve opening for particular throttle opening in response to the pressure differential effective to move fuel through such opening. This pressure differential is, as already stated, greater than the general or static intake depression when the latter is least because the depression for moving the fuel is taken from the throat of the venturi with minimum primary air introduction into the fuel conduit, and during fractional load operation is less than the general intake depression by reason of maximum primary air introduction into the fuel conduit. The curves A show fuel flow for the several throttle openings in a mode of showing that corresponds to variable speed-variable load, that is to say, the beginning of right hand end points for 10°, 14°, etc., of throttle opening, each represents by its distance toward the left from the zero depression end of the graph the static depression for the particular throttle opening at the minimum working speed of say 400 revolutions per minute (with the corresponding fuel flow plotted vertically), the rise of intake depression, indicated by the passing of the particular curve A to the left, being due, of course, to speed increase which, with the stationary throttle opening and stationary fuel valve opening, can only be obtained by reduction of load. This increase of speed requires a greater cc/m flow of fuel, notwithstanding the decrease of load.

I have plotted fuel flow curves B for constant speed, variable load by connecting up like approximately spotted speeds C on the several throttle opening curves A, and it will be plain that the loads vary for these constant speeds, since a given speed is productive of increased power when obtained at an increased throttle opening. It will be observed that constant speed, variable load operation is productive of such change in rate of fuel flow that the fuel flow curve obtained shows smooth transition, and desirable interrelationship throughout.

In Fig. 12, the vertical arrow between the ordinates "2" and "1" indicates approximately the value of static intake depression at which the induction valve 98 closes or opens. The curves A illustrate how at small throttle openings (for example, for throttle openings of from 10° to 20°) maximum attenuation of the pressure differential on the orifice, together with maximum reduction in orifice area, is effective substantially throughout the speed range to cause minimum fuel flow, varying but slightly with the speed, although the intake depression is then substantially. At intermediate throttle positions and larger fuel orifice areas, (for example, for throttle openings of from 25° to 50°), the induction valve closes at the lower speeds and opens at higher speeds, the larger the throttle opening the higher the speed at which the valve 98 closes and opens. For such intermediate throttle openings, the cc/m flow of fuel at minimum speeds is greater than the flow at the same speeds at the smaller throttle openings although the intake depression at such speeds is less at the intermediate throttle positions.

As the air throttle and fuel orifice 58 approach wide open position, the induction valve remains in position of minimum opening substantially throughout the speed range, and, although the intake depression is then minimum and varies but slightly as the speed varies over the range thereof, the fuel flow is maximum and varies over a substantial range with the speed, the fuel flow at wide open throttle being accentuated at minimum speed and minimum depression by the hydrostatic action above described.

Fuel for idling

I supply the fuel for idling entirely independently of the main fuel supplied at other stages of operation, i. e. without being affected by variations in flow of main fuel, and at a relatively constant minimum rate notwithstanding variations or fluctuations of intake depression at or near idling operation. To obtain such result I lift fuel in a solid liquid state through duct 114 from the constant level float chamber 62 into a chamber or passage section 116 having a relatively weak pressure reduction therein obtained by venting one end of the chamber to the intake through a highly constricted orifice 68 and by venting the other end of the chamber 116 to the atmosphere through orifice 118. The pressure reduction developed in chamber 116 attains a value, which is relatively constant, sufficient to lift the fuel into the chamber at the high intake depressions prevailing at or near idling operation so that the idling fuel is available at such stage of operation.

The fuel thus lifted forms a fuel level in chamber 116 which is subjected to the turbulent effect of the air passing through orifice 118 and sweeping over the fuel or therethrough to form, apparently, a compressible suspension of fuel in air. The resulting suspension or mixture is squeezed through the highly constricted orifice 68 for delivery into the intake beyond the throttle. The fixed orifice 68 serves to meter the fuel component therethrough at a substantially constant rate, the mixture being wire drawn, in effect, and issuing through the orifice 68 as a fine stream of atomized fuel particles.

Air bleed opening 118 is preferably somewhat larger than the metering jet opening 68, as, for example in one 300 cu. in. engine the opening 68 was .015" in diameter and opening 118 was .022" in diameter. Satisfactory operation has been obtained with air bleed opening 118 of the order of .020" to .024" in diameter and with a metering orifice 68 of the order of .013" to .015" diameter.

As already stated, the valve 98 opens conduit 66 to the atmosphere during idling so that the depression on the metering idling jet 68 is less than the depression at the fuel nozzle 10 or 10a, thus enabling the use of a jet size at 68 which is not so excessively small as otherwise would be required, and avoiding frictional effects and irregular flow. In the form of the invention disclosed the idling charge passing jet 68 is carried by the air in passage 66 and discharged through the nozzle 10 or 10a, the fuel for idling, in effect, being bypassed around the metering orifice 58. With the metering of idling fuel in the form of air-fuel mixture through the jet 68 with openings 68 and 118 of about the sizes above named I find that the idling fuel flow remains substantially constant as indicated at D Fig. 12, when the air-throttle is moved to openings within the neutral range of cam part 72a, giving very smooth and steady idling that does not surge materially even with considerable fluctuation in intake depression.

The idling fuel and air passages 114 and 118 and fuel-air passage 68 remain open at all times, but, inasmuch as the idling jet 68 is above the fuel level, and chamber 116 is vented at 118, the fuel quantity supplied at 68 is substantially negligible except at idling and during blending into low fractional load operation. The contour of the part 72b of cam 72 for controlling the first opening of valve 70 is such as to supply at 58 only the fuel required in addition to that already available at 68, so that there is secured from idling a smooth transition or "take-out" into fractional load operation.

Acceleration fuel

I supply acceleration fuel upon quick throttle opening movement by interposing a throttle operated pump 120 in the fuel line. It will be observed that upon quickly opening the throttle the vent at 96 to atmosphere is substantially closed by valve 98 due to lowered intake depression. This insures delivery at nozzle 10 or 10a of the fuel forcibly pumped by pump piston 122. Any fuel passing pump piston 122, which has preferably a loose fit in the pump cylinder, gets back through duct 124 to the float chamber 62 on retraction of the pump piston 122. In my system the fuel passage opening 58 is substantially closed when the air throttle is closed so that pump 120 is relied to supply the fuel for starting, obviating the need for reliance on pressure reduction by utilizing the throttle 12 as an ordinary choke. Piston actuating link 126 can comprise a lost motion slot 128 to accommodate the piston stroke to the angular movement of the throttle lever 130 working against spring 132 in said slot. A check valve 134 in the fuel line prevents a rearward fuel movement when pump piston 122 is actuated, so that the main fuel supply is temporarily closed off and the entire quantity of fuel in the pump cylinder and passage 60 is forcibly ejected by pump piston 122 without reliance on pneumatic pressure differential. Thus increased air flow is accompanied by simultaneous increase in fuel flow, without inertia retardation to fuel flow increase. The fuel discharge so obtained extends over a material interval of time lasting until the desired acceleration is obtained.

Heat supply at starting on non-volatile fuel

I supply as shown at Figs. 10 and 11 the heat required for engine starting on non-volatile fuel by flame in the exhaust conduit supplied by a preheater 136, and desirably concentrate the flame on the exhaust side of the walls of crucible 24a and dome 26a, and also so direct the flame as to heat up the massive heat-storage bulb 50a. The preheater comprises a torch 138 supplied with fuel through pipe 140 from chamber 62 and with compressed air for atomizing through pipe 142, and is received into venturi 144 of a tube 146 having air openings 148 for the induction of combustion air into the venturi at the rear thereof and suitably perforated at 150 for supplying additional combustion air. The fuel and air valves 152 and 154 can be turned on together by the interconnecting control 156. The circuit 158 for ignition of the mixture by the spark ignition means 160 is closed by switch 162. The burned gases can pass out through the main exhaust at 164 and/or through the companion outlet passage 166 normally serving during engine operation to conduct exhaust gases into contact with the interior of dome 26a to heat the same.

The spark plug or ignition means 160 is preferably in circuit with a gap 168 and a vibrating coil 170, and is arranged sufficiently far ahead of blast nozzle torch 138 to insure ignition. The sparking means 160 forming gap 168 comprises spaced electrodes 172 and 172a, the electrode 172a being electrically connected to tube 146 which is grounded. The gap 168 thus formed is disposed substantially centrally of the tube 146 and is not liable to be affected by the presence of fuel.

Compressed air for the starting torch can be taken from a storage tank 174 connected through a check valve 176 with the compressor 16. Storage tank 174 also has a separate charging inlet 178 for compressed air charging thereof at service stations where compressed air is available. When the preheater 136 is not in use, the entrance to the exhaust passages therefrom is closed by means of slide 180. A similar arrangement for cooperation with a preheater is indicated at 180a, Fig. 3. With this arrangement of preheater the crucible and other parts can be heated in a very short time so that upon starting up the engine the fuel oil coming in contact therewith is vaporized and burns in the engine cylinders so that the exhaust is practically free from smoke. On operating the engine the exhaust gas supplies the heat to keep the crucible and other walls up to the temperature that is needed to put the fuel into a proper state of vaporization.

By my invention, the pressure differential on the fuel and the fuel passage are coordinated so that the fuel is supplied in suitable ratio to the air substantially throughout the range of operation of the engine, notwithstanding that the intake depression varies at times in inverse relation to the fuel requirements, and at other times, while varying directly with fuel requirements, tends to cause either too much fuel flow or not enough. With my system of fuel control the pressure reduction beyond the throttle is made available for the discharge of the fuel directly thereinto so that the fuel, by discharge into a region of reduced pressure, is more easily vaporized, and the same may be discharged directly into contact with heated surfaces without being impeded by the throttle. At engine idling however the fuel is supplied independently of the main fuel and at a substantially constant rate substantially immune to variations in intake depression so that the obtaining of a smoothly running idle is insured, without using a highly constricted main annular orifice, as at 58, for this purpose, which use would render more difficult the obtaining of the proper fuel passage areas at 58 for the various throttle positions beyond idling besides being unsuited for producing a smooth idle.

Fuel atomization or vaporization is also assisted by aerating the fuel first by the fuel flow controlling primary air and again by discharge of air centrally through the annular stream of primary air aerated fuel, so that the fuel assumes under the action of the several vaporizing influences, a thoroughly homogeneous state in suspension in the air.

Having thus described my invention, what I claim and desire to secure by Letters Patent is:

1. Process of supplying charges for internal combustion engines and proportioning the air and fuel, comprising controlling the passage of air, delivering the fuel from a constant level supply through a metering orifice into the air in the region of intake depression on the engine side of the point of air passage control while controlling the pressure differential on the fuel at the metering orifice, and producing for each of the air control positions the metering orifice area predetermined to be suitable for allowing a fuel flow in response to the controlled pressure differential effective thereon, which is in suitable ratio to the air supplied substantially throughout the pressure differential range.

2. Process of supplying charges for internal combustion engines and proportioning the air and fuel, comprising controlling the passage of air, delivering the fuel into the air in the region of intake depression on the engine side of the point of air passage control while controlling the pressure differential on the fuel to produce reduction thereof below the gross pressure differential available that is greater at the higher intake depressions than at the lower, and producing for each of the air control positions a fuel passage area of the value for allowing a fuel flow in response to the pressure differential effective thereon, which is in suitable ratio to the air supplied substantially throughout the pressure differential range.

3. Process of supplying charges for internal combustion engines and proportioning the air and fuel, comprising controlling the passage of air, delivering the fuel from a constant level source through a metering orifice into the air in the region of intake depression on the engine side of the point of air passage control while introducing air into the fuel for reducing the pressure differential on the fuel at the metering orifice relatively to that available, and producing for each of the air control positions a predetermined metering orifice area of the value for allowing a fuel flow in response to the pressure differential effective thereon, which is in suitable ratio to the air supplied substantially throughout the pressure differential range.

4. Process of supplying charges for internal combustion engines and proportioning the air and fuel, comprising controlling the passage of air, delivering the fuel into the air in the region of intake depression beyond the point of air control, while controlling for various air control positions the pressure differential on the fuel relative to that available, so that the pressure differential on the fuel is maintained within range to prevent, upon fuel passage area adjustment, excessive fuel flow, and producing for each of the various air control positions the fuel passage area of the particular value individually determined therefor for allowing, in response to the variations of pressure differential on the fuel as the speed varies, a fuel flow in suitable ratio to the air supplied.

5. Process of supplying charges for internal combustion engines and proportioning the air and fuel, comprising controlling the passage of air, delivering the fuel into the air in the region of intake depression beyond the point of air control while introducing air into the fuel for reducing at various air control positions the pressure differential on the fuel relative to that available so that the pressure differential on the fuel is maintained within range to prevent, upon fuel passage area adjustment, excessive fuel flow, and producing for each air control position the fuel passage area of the particular value for allowing, in response to the variations of pressure differential on the fuel as the speed varies, a fuel flow in suitable ratio to the air supplied.

6. Process of supplying charges for internal combustion engines and proportioning the air and fuel, comprising controlling the passage of air, delivering the fuel into the air in the region of intake depression beyond the point of air control while introducing air into the fuel, more at high intake depressions than at low, for reducing at various air control positions the pressure differential on the fuel relative to that available so that the pressure differential on the fuel is maintained within range to prevent, upon fuel passage area adjustment, excessive fuel flow, and producing for each air control position the fuel passage area of the particular value for allowing, in response to the variations of pressure differential on the fuel as the speed varies, a fuel flow in suitable ratio to the air supplied.

7. Process of supplying charges for internal combustion engines and proportioning the air and fuel, comprising controlling the passage of air, delivering the fuel into the air on the engine side of the point of air control while introducing air in with the fuel on the way to such point of discharge principally when intake depression exceeds that for full-load operation, and producing for each air control position at a point back of the air introducing point a fuel passage area having a value so related to the pressure difference, that remains after diminution by air introduction and is effective across the point of fuel passage control, as to allow the flow, in response to such remaining pressure difference, of fuel in suitable ratio to the air supplied throughout the speed range.

8. Process of supplying charges for internal combustion engines and proportioning the air and fuel, comprising controlling the passage of air, delivering the fuel on the engine side of the point of air control preferably at a region of maximum air velocity while, for the various air control positions, introducing air in with the fuel on the way to such point of discharge but in greater quantity when intake depression exceeds that for full-load operation than at lesser intake depressions, and producing for each air control position at a region back of the air introducing point a fuel passage area of the particular value individually determined in relation to the pressure difference, that remains after diminution by air introduction and is effective across the point of fuel passage control, so as to allow the flow, in response to such remaining pressure difference, of fuel in suitable ratio to the air supplied throughout the speed range.

9. Process of supplying charges for internal combustion engines and proportioning the air and fuel, comprising controlling the passage of air, delivering the fuel from a constant level source of supply into the air on the engine side of the point of air control while introducing air in with the fuel at a point below the level of the fuel in said constant level source, and producing for each air control position, at a point below the point of introduction of the air into the fuel, a fuel passage area having a value so related to the pressure differential effective on the fuel across the point of fuel passage control as to allow the flow, in response to such pressure differential, of fuel in suitable ratio to the air supplied throughout the speed range.

10. Process of supplying charges for internal combustion engines and proportioning the air and fuel, comprising controlling the passage of air, delivering the fuel from a constant level source of supply into the air in the region of intake depression on the engine side of the point of air control while introducing air into the fuel at a point below the level of the fuel in said constant level source for reducing at various air control positions the pressure differential on the fuel relative to that available so that the pressure differential is maintained within range to prevent, upon fuel passage area adjustment, excessive fuel flow, and producing for each air control position, at a point below the point of introduction of the air into the fuel, a fuel passage area having the particular value individually determined therefor for allowing, in response to the pressure differential effective on the fuel across the point of fuel passage control as the speed varies, a fuel flow in suitable ratio to the air supplied.

11. Process of supplying charges for internal combustion engines and proportioning the air and fuel, comprising controlling the passage of air, delivering the fuel from a constant level source of supply into the air in the region of intake depression on the engine side of the point of air control while introducing air into the fuel at a point below the level of the fuel in said constant level source principally at intake depressions in excess of a given minimum for reducing at various air control positions the pressure differential on the fuel relative to that available so that the pressure differential on the fuel is maintained within range to prevent, upon fuel passage area adjustment, excessive fuel flow, and producing for each air control position, at a point below the point of introduction of the air into the fuel, a fuel passage area having the particular value individually determined therefor for allowing, in response to the pressure differential effective on the fuel across the point of fuel passage control as the speed varies, a fuel flow in suitable ratio to the air supplied.

12. Process of supplying charges for internal combustion engines and proportioning the air and fuel, comprising controlling the passage of air, delivering the fuel into the air in the region of intake depression on the engine side of the point of air passage control while pneumatically controlling the pressure differential on the fuel to cause variation of reduction thereof, relatively to the pressure differential available for promoting fuel flow, which reduction is least at a relatively low value of intake depression at full load operation and which is more at higher intake depressions, and producing for each of the air control positions a fuel passage area of the value for allowing a fuel flow, in response to the pressure differential effective thereon, which is in suitable ratio to the air supplied substantially throughout the pressure differential range.

13. Process of supplying charges for internal combustion engines and proportioning the air and fuel, comprising controlling the passage of air, delivering the fuel into the air in the region of intake depression on the engine side of the point of air passage control, while controlling in response to changes in intake depression the pressure differential on the fuel to cause variation of reduction thereof relatively to the pressure differential available for promoting fuel flow, and producing for each of the air control positions a fuel passage area of the value for allowing a fuel flow, in response to the pressure differential effective thereon, which is in suitable ratio to the air supplied substantially throughout the pressure differential range.

14. Process of supplying charges for internal combustion engines and proportioning the air and fuel, comprising controlling the passage of air, delivering the fuel into the air in the region of intake depression on the engine side of the point of air passage control while introducing air into the fuel for reducing the pressure differential on the fuel relatively to that available for promoting fuel flow, the air introduction being reduced to minimum in response to and at a relatively low intake depression, and producing for each of the air control positions a fuel passage area of the value for allowing a fuel flow, in response to the pressure differential effective thereon, which is in suitable ratio to the air supplied substantially throughout the pressure differential range.

15. Process of supplying charges for internal combustion engines and proportioning the air and fuel, comprising controlling the passage of air, delivering the fuel into the air in the region of intake depression beyond the point of air control while introducing air into the fuel and controlling the admission thereof for reducing, principally at intake depressions greater than that for full load, the pressure differential on the fuel relative to that available for promoting fuel flow so that the pressure differential is maintained within range, to prevent, upon fuel passage area adjustment, excessive fuel flow, and producing for each air control position the fuel passage area of the particular value individually determined therefor for allowing, in response to the variations of pressure differential on the fuel as the speed varies, a fuel flow in suitable ratio to the air supplied.

16. Process of supplying charges for internal combustion engines and proportioning the air and fuel, comprising controlling the passage of air, delivering the fuel into the air in the region of intake depression beyond the point of air control, while reducing the pressure differential on the fuel relatively to that available for promoting fuel flow principally at intake depressions greater than that for full load, the reduction in pressure differential being made greater as the intake depression increases so that the pressure differential is maintained within range to prevent, upon fuel passage area adjustment, excessive fuel flow, and producing for each of the various air control positions the fuel passage area of the particular value individually determined therefor for allowing, in response to the variations of pressure differential on the fuel as the speed varies, a fuel flow in suitable ratio to the air supplied.

17. Process of supplying charges for internal combustion engines and proportioning the air and fuel, comprising controlling the passage of air, delivering the fuel into the air on the engine side of the point of air control while introducing air in with the fuel on the way to such point of discharge principally when intake depression exceeds that at full load operation, the air introduction becoming increasingly effective in reducing the pressure differential on the fuel as the intake depression increases, and producing for each air control position at a point back of the air introducing point a fuel passage area having a value so related to the pressure difference, that remains after diminution by air introduction and is effective across the point of fuel passage control, as to allow the flow, in response to such remaining pressure difference, of fuel in suitable ratio to the air supplied throughout the speed range.

18. Process of supplying charges for internal combustion engines and proportioning the air and fuel, comprising controlling the passage of air, delivering the fuel from a constant level source of supply into the air on the engine side of the point of air control while introducing air in with the fuel, and producing for each air control position, at a point below the point of introduction of the air into the fuel and below the fuel level in the constant level source, a fuel passage area having a value so related to the pressure differential effective on the fuel across the point of fuel passage control as to allow the flow, in response to such pressure differential, of fuel in suitable ratio to the air supplied throughout the speed range.

19. Process of supplying charges for internal combustion engines and proportioning the air and fuel, comprising controlling the passage of air, delivering the fuel from a constant level source into the air in the region of intake depression on the engine side of the point of air passage control, introducing air in with the fuel on the way to such point of discharge and controlling the air introduced to render the same effective principally at intake depression exceeding that at full load operation for reducing the pressure difference on the fuel so that the pressure difference is maintained within range to prevent, upon fuel passage area adjustment, excessive fuel flow, and producing for each air control position at a point below the air introducing point a fuel passage area of the particular value individually determined in relation to the pressure difference, that remains after diminution by air introduction and is effective across the point of fuel passage control, so as to allow the flow, in response to such reduced pressure difference, of fuel in suitable ratio to the air supplied throughout the speed range.

20. Process of supplying charges for internal combustion engines and proportioning the air and fuel, comprising controlling the passage of air, delivering the fuel from a constant level source into the air in the region of intake depression on the engine side of the point of air passage control, introducing air, introduced at a point below the fuel level, in with the fuel on the way to such point of discharge and controlling the air introduced to render the same effective principally at intake depression exceeding that at full load operation for reducing the pressure difference on the fuel so that the pressure difference is maintained within range to prevent, upon fuel passage area adjustment, excessive fuel flow, and producing for each air control position at a point below the air introducing point a fuel passage area of the particular value individually determined in relation to the pressure difference, that remains after diminution by air introduction and is effective across the point of fuel passage control, so as to allow the flow, in response to such reduced pressure difference, of fuel in suitable ratio to the air supplied throughout the speed range.

21. Process of supplying charges for internal combustion engines, comprising controlling the passage of air, introducing main fuel into the air in the region of intake depression beyond the point of air control, controlling the flow of main fuel in part by air introduction thereinto and in part by fuel passage variation adjunctively to throttling, and at engine idling substantially closing off the flow of main fuel and bypassing the fuel for idling around the point of main fuel passage control and introducing the idling fuel into said second named air for delivery into the intake at the point of main fuel introduction.

22. Process of supplying charges for internal combustion engines, comprising controlling the passage of air, introducing main fuel into the air in the region of intake depression beyond the point of air control, controlling the passage of fuel and introducing primary air into the fuel beyond the point of fuel passage control and, at engine idling, bypassing the fuel therefor around the point of main fuel passage control into the primary air and delivering the mixture into the air at the point of main fuel introduction.

23. Process of supplying charges for internal combustion engines and proportioning the fuel and air, comprising controlling the passage of air, delivering the fuel into the air in the region of intake depression beyond the point of air control, reducing the effect of intake depression on fuel flow when the intake depression is high and augmenting the effects thereof on fuel flow when the intake depression is relatively low, and producing for each of the various air control positions a fuel passage area individual thereto for allowing, in response to the variations in adjusted pressure differential on the fuel as the speed varies, a fuel flow in suitable ratio to the air supplied.

24. Process of supplying charges for internal combustion engines and proportioning the fuel and air, comprising controlling the passage of air, delivering the fuel into the air in the region of intake depression beyond the point of air control, reducing by introducing air into the fuel the effect of intake depression on fuel flow when the intake depression is high and augmenting by air flow the effects of intake depression on fuel flow when the intake depression is relatively low, and producing for each of the various air control positions a fuel passage area individual thereto for allowing, in response to the variations in adjusted pressure differential on the fuel as the speed varies, a fuel flow in suitable ratio to the air supplied.

25. Process of supplying charges for internal combustion engines and proportioning the fuel and air, comprising controlling the passage of air, delivering the fuel into the air in the region of intake depression beyond the point of air control, introducing air into the fuel for reducing the effect of intake depression on fuel flow, subjecting the fuel to air flow for augmenting the effects of intake depression on fuel flow, controlling the air introduction to reduce the same as the air flow effect increases, and vice versa, and producing for each of the various air control positions a fuel passage area individual thereto for allowing, in response to the variations in adjusted pressure differential on the fuel as the speed varies, a fuel flow in suitable ratio to the air supplied.

26. Process of supplying charges for internal combustion engines and proportioning the fuel and air, comprising controlling the passage of air, delivering the fuel into the air in the region of intake depression beyond the point of air control, introducing air into the fuel continuously throughout the speed range at each of the most restricted air control positions for reducing the effect of intake depression on fuel flow, rendering the air introduction a minimum substantially throughout the speed range at each of the least restricted air control positions to render the intake depression more effective on fuel flow, controlling the air introduction at each of the intermediate air control positions to render the effect thereof minimum at the lower speeds and maximum at the higher speeds, and producing for each of the various air control positions a fuel passage area individual thereto for allowing, in response to the variations in pressure differential on the fuel as the speed varies, a fuel flow in suitable ratio to the air supplied.

27. Process of supplying charges for internal combustion engines and proportioning the fuel and air, comprising controlling the passage of air, delivering the fuel into the air in the region of intake depression, introducing air into the fuel continuously at each of the most restricted of the air control positions and causing the air introduced to become more effective in reducing fuel flow as the speed increases throughout the range, and vice versa, rendering the air introduced a minimum at each of the least restricted air control positions, controlling the air introduced at intermediate air control positions to render the air introduced minimum at the lower speeds and maximum at the higher speeds, and to effect a progressive transition from maximum to minimum air introduction, and vice versa, and producing for each of the various air control positions a fuel passage area individual thereto for allowing, in response to the variations in pressure differential on the fuel as the speed varies, a fuel flow in suitable ratio to the fuel supplied.

28. In apparatus for supplying and proportioning charges for internal combustion engines comprising an intake, air controlling means, means for conducting fuel into the intake beyond the air controlling means, means for modifying the pressure differential on the fuel relative to the intake depression available, and means for adjusting the fuel passage including a cam having a contour giving at each air control position the fuel passage area for allowing a fuel flow, in response to the adjusted pressure differential effective thereon, which is in suitable ratio to the air supplied substantially throughout the pressure differential range.

29. In apparatus for supplying and proportioning charges for internal combustion engines comprising an intake, air controlling means, means for conducting fuel into the intake beyond the air controlling means, means for introducing air into the fuel to reduce the pressure differential effective thereon, and fuel passage controlling means operated adjunctively with the air controlling means, and including a cam having a contour predetermined to give a fuel passage opening at each air control position calibrated to allow a fuel flow, in response to the reduced pressure differential effective thereon, which is in suitable ratio to the air supplied substantially throughout the pressure differential range.

30. In apparatus for supplying and proportioning charges for internal combustion engines comprising an intake, air controlling means, means for conducting fuel into the intake beyond the air controlling means, means for introducing air into the fuel to reduce the pressure differential effective thereon, means for controlling the air introduction to reduce the effects thereof at low intake depression, and fuel passage controlling means including a cam having a contour predetermined to produce the particular fuel passage area at each air control position suited to the pressure differential effective on the fuel throughout the range thereof.

31. In apparatus for supplying and proportioning charges for internal combustion engines comprising an intake, air controlling means, means for conducting fuel into the intake beyond the air controlling means, means for introducing air into the fuel to reduce the pressure differential effective thereon, means operated by intake depression for substantially reducing the air introducing means at a predetermined value of intake depression in excess of that at full-load high speed, and means operated by the air controlling means for varying the fuel passage area.

32. In apparatus for supplying and proportioning charges for internal combustion engines comprising an intake, air controlling means, means for conducting fuel into the intake beyond the air controlling means, means for introducing air into the fuel to reduce the pressure differential effective thereon, valvular means operated in response to intake depression for controlling the air introducing means, said last named means being adapted to maintain a substantially fixed air opening during movement thereof over the higher portion of the intake depression range, and to progressively vary the air opening at a relatively lower portion of the intake depression range, and means for controlling the fuel passage area.

33. In apparatus for supplying and proportioning charges for internal combustion engines comprising an intake, air controlling means, means for conducting fuel into the intake beyond the air controlling means, means for reducing the pressure differential on the fuel at high intake depression, means for increasing the pressure differential on the fuel at low intake depression, and means for controlling the fuel passage area.

34. In apparatus for supplying and proportioning charges for internal combustion engines comprising an intake, air controlling means, means for conducting fuel into the intake beyond the air controlling means, means for introducing air into the fuel for reducing the pressure differential thereon relative to the intake depression, means for augmenting the effects of intake depression on fuel flow, and means for adjusting the fuel passage area.

35. In apparatus for supplying and proportioning charges for internal combustion engines comprising an intake, air controlling means, means for conducting fuel into the intake beyond the air controlling means, means for reducing the effect of intake depression on fuel flow at high intake depressions, a venturi disposed in the intake about the discharge end of the fuel line for augmenting the effect of intake depression on fuel flow when the same is low, and means for controlling the fuel passage area.

36. In apparatus for supplying and proportioning charges for internal combustion engines comprising an intake, air controlling means, means for conducting fuel into the intake beyond the air controlling means, means for introducing air into the fuel, means operated in response to intake depression for substantially reducing the air introducing means at relatively low intake depression, a venturi disposed about the discharge end of the fuel line effective at relatively low intake depression for augmenting the effect thereof on fuel flow, and means operated with the air controlling means for controlling the fuel passage, including a cam giving a fuel passage area at each air control position adjusted to the pressure differential on the fuel.

37. In apparatus for supplying and proportioning charges for internal combustion engines comprising an intake, air controlling means, a constant level float chamber, means for supplying fuel therefrom to the intake beyond the air controlling means, means for introducing air into the fuel line at a point below the fuel level, and means for controlling the fuel passage area at a point below the point of introduction of the air into the fuel passage.

38. In apparatus for supplying and proportioning charges for internal combustion engines comprising a downdraft intake, air controlling means therefor, a constant level float chamber, an inverted U shaped passage for conducting fuel therefrom into the intake below the air controlling means, one arm of said passage being formed as a downwardly directed fuel nozzle in the intake, and the intermediate portion of said passage being disposed above the fuel level, means for modifying the pressure differential effective for fuel flow, and means for controlling the fuel passage area.

39. In apparatus for supplying and proportioning charges for internal combustion engines comprising an intake, means for conducting fuel into the intake beyond the air controlling means, means for introducing air into the fuel line, means for subjecting the resulting mixture at the discharge end thereof to an atomizing discharge of gas, and means for controlling the fuel passage area.

40. In apparatus for supplying and proportioning charges for internal combustion engines comprising an intake, air controlling means, a fuel nozzle disposed in said intake beyond the air controlling means, a relatively small passage vented to atmosphere for conducting air into said nozzle, and means for supplying fuel for idling into said passage intermediate the vent and the nozzle, said means including a chamber having a fuel inlet communicating with a fuel supply, an inlet orifice from atmosphere, and a highly constricted discharge orifice into said small passage.

41. In apparatus for supplying and proportioning charges for internal combustion engines comprising an intake, air controlling means, a fuel nozzle in the intake beyond the air controlling means, means for controlling the passage of fuel to said nozzle, and means for supplying idling fuel into the intake beyond the air control means at a substantially constant rate entirely independent of flow of main fuel and substantially immune to pressure variations in the intake.

42. In apparatus for supplying and proportioning charges for internal combustion engines comprising an intake, air controlling means, means for conducting main fuel into said intake beyond the air controlling means, means for introducing air into said fuel conducting means, means below the air introducing means for controlling the passage of fuel adapted to substantially close the fuel passage at engine idling, and means for introducing fuel for idling into said fuel conducting means at a point beyond the point of introduction of air thereinto.

43. The hereindescribed process of supplying charges for internal combustion engines and proportioning the air and fuel, comprising controlling the passage of air to the engine cylinders, conducting fuel through a metering orifice into the intake in the region of intake depression at the engine side of the air control together with primary air introduced at the posterior side of the metering orifice to attenuate the variable pressure differential thereon, and producing for each of the air control positions a metering orifice area of the particular value individually determined allowing, in response to the variations in attenuated pressure differential as the speed varies, a flow of fuel in suitable ratio to the air supplied, the orifice area and the pressure differential on the orifice being coordinated at each air control position to minimize orifice frictional coefficients.

44. The process of preparing charges for internal combustion engines which consists in introducing fuel into the intake at the engine side of the air controlling means from a constant level supply through a submerged orifice subject to the fuel flow inducing effect of intake depression and venturi action, modulating the fuel flow at said orifice while introducing primary air into the fuel line at the posterior side of said orifice to reduce the variable pressure differential thereon, the modulation and the primary air introduction being coordinated to minimize frictional coefficients at said orifice, and the primary air introduction counteracting excessive fuel flow inducing effects due to venturi action at maximum speeds.

45. The process of preparing charges for internal combustion engines which consists in controlling the pasage of air to the cylinders in accordance with the conditions of engine operation, introducing fuel from a constant level supply into the air stream at the engine side of the air controlling means through a submerged metering orifice modulated at fractional loads to keep the fuel flow within range while minimizing frictional effects production of erratic fuel flow, the minimizing of friction being effected by introducing primary air at a submerged point into the fuel line at the posterior side of the metering orifice to maintain an attenuated variable pressure differential thereon coordinated with the modulation to cause the desired fuel flow, the admission of primary air being reduced at full load operation to render the intake depression more effective in causing fuel flow.

46. Process of supplying charges for internal combustion engines, comprising introducing fuel from a constant level supply through a submerged metering orifice into the intake at the engine side of the air controlling means together with primary air introduced at a submerged point at the posterior side of the metering orifice to attenuate the pressure differential thereon, the primary air being closed off hydrostatically by the fuel in response to a drop in depression for preventing attenuation of the pressure differential on the orifice at full load low speed.

47. The process of preparing charges for internal combustion engines which consists in introducing fuel into the intake at the engine side of the air controlling means, and modulating the fuel flow through a metering orifice while introducing primary air into the fuel line at the posterior side of the metering orifice to attenuate the pressure differential thereon, the primary air being controlled to reduce the attenuation of pressure differential at the orifice at certain reduced depressions characterizing full load conditions, and to prevent any attenuation as the depression approaches the minimum characterizing low speed conditions at full load.

48. The process of preparing charges for internal combustion engines which consists in introducing fuel into the intake at the engine side of the air controlling means, and modulating the fuel flow through a metering orifice while introducing primary air into the fuel line at the posterior side of the orifice to attenuate the pressure differential thereon, the primary air being controlled at separate stages of operation to reduce the attenuation, at one stage, in response to the intake pressure reduction as the same falls to a predetermined intermediate value, and at another stage, by an independent operation in response to the intake pressure reduction as the same approximates a minimum value.

49. The process of preparing charges for internal combustion engines which consists in introducing fuel into the intake at the engine side of the air controlling means, and modulating the fuel flow through a metering orifice while introducing primary air into the fuel line at the posterior side of the orifice to attenuate the pressure differential thereon, the primary air introduction being reduced to lessen the attenuation under full load conditions of operation, the reduction being made maximum at low speed by the hydrostatic action of the fuel in response to and as the pressure reduction in the intake approaches the minimum.

50. The process of preparing charges for internal combustion engines which consists in introducing fuel into the intake at the engine side of the air controlling means, and modulating the fuel flow through a metering orifice while introducing primary air into the fuel line at the posterior side of the orifice to attenuate the pressure differential thereon, the primary air introduction being reduced pneumatically in response to the pressure reduction in the intake as the same approaches a predetermined intermediate value, and hydrostatically by the fuel in response to a drop of the intake pressure reduction to a value corresponding to full load low speed operation.

51. The process of preparing charges for internal combustion engines which consists in introducing fuel into the intake at the engine side of the air controlling means subject to the fuel flow inducing effect of intake depression and venturi action, and modulating the fuel flow through a metering orifice while introducing primary air into the fuel line at the posterior side of the orifice to attenuate the pressure differential thereon, the admission of primary air being reduced to reduce the attenuation of pressure differential under full load conditions, the attenuation remaining counteracting the excessive fuel flow inducing effects of the venturi action at high speeds, and being closed off to prevent attenuation as the pressure reduction in the intake approaches a minimum at low speed.

52. The process of preparing charges for internal combustion engines which consists in introducing fuel into the intake at the engine side of the air controlling means subject to the fuel flow inducing action of intake depression and to a supplementary fuel flow inducing cause becoming most effective at full load high speed, modulating the fuel flow through a metering orifice while introducing primary air into the fuel line at the posterior side of the orifice to attenuate the variable pressure differential thereon, the primary air being introduced in reduced quantity under conditions of full load operation when the fuel flow inducing causes in the intake are more effective, and being closed off as the fuel flow inducing causes approach the minimum.

53. The hereindescribed process of preparing charges for internal combustion engines which consists in controlling the passage of air to the engine cylinders, conducting fuel through a metering orifice into the intake in the region of intake depression at the engine side of the throttle together with primary air introduced at the posterior side of the metering orifice in a quantity producing a variable pressure differential on the orifice attenuated relative to the intake depression, producing for each air control position a different orifice area coordinated with the attenuated pressure differential to allow, in response to the variations thereof, a flow of fuel in suitable ratio to the air, and, as the intake depression approaches a predetermined value corresponding to a full load condition reducing the admission of primary air in response to the pressure reduction in the intake for reducing the attenuation of pressure differential on the orifice.

54. The hereindescribed process of preparing charges for internal combustion engines which consists in introducing fuel into the intake at the engine side of the air controlling means from a constant level supply through a submerged metering orifice subject to the fuel flow inducing effect of intake depression and a supplementary fuel flow inducing cause becoming more effective at full load operation, modulating the fuel flow through said orifice while introducing primary air into the fuel line at the posterior side of the orifice to attenuate the pressure differential thereon, the introduction of primary air being reduced in response to and as the pressure reduction in the intake substantially approaches a value corresponding to transition into full load operation.

55. In apparatus for supplying and proportioning charges for internal combustion engines comprising an intake conduit, an air throttle therein, means for supplying fuel to the intake conduit at the engine side of the throttle, including a metering orifice, means for introducing air into the fuel supplying means at the discharge side of said metering orifice to reduce the pressure differential thereon, a cam operated by the air throttle, and a valve controlled by said cam and coacting with said metering orifice to vary the area thereof in accordance with a predetermined fuel curve, the orifice area produced at each throttle position being coordinated with the reduced pressure differential on the orifice to reduce orifice frictional coefficients while allowing a flow of fuel in suitable ratio to the air.

56. In apparatus for supplying and proportioning charges for internal combustion engines comprising an intake conduit, an air throttle therein, means including a float chamber for supplying fuel to the intake conduit at the engine side of the air controlling means, and including a submerged metering orifice, means for introducing air into the fuel supplying means below the fuel level at the discharge side of said metering orifice to reduce the variable pressure differential thereon, and a valve operated to vary the metering orifice area in accordance with a predetermined fuel curve, the orifice area and the reduced pressure differential on the orifice being coordinated to reduce orifice frictional coefficients while allowing a flow of fuel in suitable ratio to the air.

57. In apparatus for supplying and proportioning charges for internal combustion engines comprising an intake having a throttle therein, a passage for conducting primary air into the intake at the engine side of the throttle, a float chamber having a fuel metering orifice therefrom into the primary air passage, said float chamber and said primary air passage being so related that the fuel closes off the supply of primary air at low depression in the intake, and means responsive to pressure reduction in the intake for reducing the admission of primary air at an intermediate value of depression in the intake.

58. In apparatus for supplying and proportioning charges for internal combustion engines comprising an intake having an air throttle therein, and a passage for conducting primary air into said intake at the engine side of said throttle, a float chamber having a submerged metering orifice therefrom to the primary air passage, said passage hydrostatically loading with fuel at low depression for closing off the primary air, means for reducing the extent of opening of said primary air passage for operation at full load, and means for varying the fuel orifice area.

59. In apparatus for supplying and proportioning charges for internal combustion engines comprising an intake, a throttle therein, a float chamber, means partially submerged in the float chamber fuel for conducting primary air into the intake at the engine side of the throttle, said submerged portion filling with fuel to close off the primary air at low depression, a fuel metering orifice opening into the submerged portion of said primary air conducting means, and having a variable pressure differential thereon attenuated by the primary air, means operated adjunctively to throttling for producing at various throttle positions metering orifice areas coordinated with the pressure differential effective on the orifice for producing desired mixture ratios while reducing frictional coefficients on the orifice, and means responsive to the intake pressure reduction for reducing the extent of opening of the primary air passage as full load operation is approached.

60. In apparatus for supplying and proportioning charges for internal combustion engines, an intake, a throttle therein, means in the intake at the engine side of the throttle for supplementing intake depression in promoting fuel flow, a fuel line having a metering orifice, and terminating in fuel flow inducing relation to said means, means for modulating said orifice, and means for introducing primary air into the fuel line at the posterior side of the metering orifice for reducing the variable pressure differential thereon, said modulating means and said air introducing means being coordinated at fractional loads to allow orifice areas minimizing orifice frictional coefficients, and said two last named means being coordinated at full load operation with said first named means to keep the fuel flow at the higher speeds within a desirable range.

61. In apparatus for supplying and proportioning charges for internal combustion engines, air intake, a throttle therein, means including a metering orifice for conducting fuel into the intake at the engine side of the throttle, means for introducing primary air into said fuel conducting means at the posterior side of said orifice to attenuate the pressure differential thereon, means for modulating said orifice, and means operated by the pressure reduction in the intake as the same approaches a value corresponding to transition from fractional load to full load operation to reduce the admission of primary air, said means being retained in position of reduced opening against movement during operation at pressure reductions in the intake below said predetermined value.

62. In apparatus for supplying and proportioning charges for internal combustion engines, an intake, a throttle therein, means for conducting fuel through a metering orifice into the intake at the engine side of the throttle, means for introducing primary air into said fuel conducting means for attenuating the variable pressure differential on said orifice, means operated upon transition from fractional to full load operation for reducing the admission of primary air, said means being retained in position of reduced opening during full load operation, and means operated as the intake pressure reduction approaches the minimum for entirely closing off the admission of primary air.

63. In apparatus for supplying and proportioning charges for an internal combustion engine, an intake, a throttle valve in said intake, a constant level float chamber, means for supplying fuel therefrom to the intake at the engine side of the throttle valve, said means having a fuel metering orifice below the fuel level of the float chamber and including a needle valve adapted to be positively actuated in accordance with the movement of the throttle valve upon acceleration for controlling said orifice, and means for bleeding air into the passage of the fuel supplying means to modify the pressure differential effective for fuel flow.

ARLINGTON MOORE.